United States Patent
Xu et al.

(10) Patent No.: US 9,792,398 B2
(45) Date of Patent: Oct. 17, 2017

(54) FLIP-FLOP CLUSTERING FOR INTEGRATED CIRCUIT DESIGN

(71) Applicant: Oracle International Corporation, Redwood Shores, CA (US)

(72) Inventors: Yue Xu, San Jose, CA (US); Manoj Kumar Ragupathy, Santa Clara, CA (US); Yu-Yen Mo, San Jose, CA (US); Dean Wu, Saratoga, CA (US); Gang Wu, Ames, ID (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 44 days.

(21) Appl. No.: 15/015,493

(22) Filed: Feb. 4, 2016

(65) Prior Publication Data

US 2017/0228485 A1    Aug. 10, 2017

(51) Int. Cl.
*G06F 17/50* (2006.01)

(52) U.S. Cl.
CPC ...... *G06F 17/5054* (2013.01); *G06F 17/5072* (2013.01); *G06F 2217/62* (2013.01); *G06F 2217/78* (2013.01)

(58) Field of Classification Search
CPC .................................................. G06F 17/5054
USPC ....................................................... 716/121
See application file for complete search history.

(56) References Cited

U.S. PATENT DOCUMENTS

| | | | |
|---|---|---|---|
| 6,351,840 B1 * | 2/2002 | Teng ................... | G06F 17/5045 716/122 |
| 8,104,014 B2 | 1/2012 | Puri et al. | |
| 8,458,634 B2 | 6/2013 | Alpert et al. | |
| 2005/0240889 A1 * | 10/2005 | Andreev ............. | G06F 17/5072 716/122 |
| 2007/0240087 A1 * | 10/2007 | Ishihara ............. | G06F 17/5045 716/113 |
| 2013/0047127 A1 * | 2/2013 | Arunachalam ..... | G06F 17/5072 716/103 |
| 2013/0194016 A1 * | 8/2013 | Wimer ............... | H03K 19/0016 327/199 |
| 2015/0020038 A1 * | 1/2015 | Feng ................... | G06F 17/5072 716/103 |

OTHER PUBLICATIONS

Q. Wu et al., "Clock-gating and its application to low power design of sequential circuits," Circuits and Systems I: Fundamental Theory and Applications, IEEE Transactions on, vol. 47, No. 3, pp. 415-420, 2000.

K. Wang et al., "Buffer sizing for clock power minimization subject to general skew constraints," in Proceedings of the 41st annual Design Automation Conference, pp. 159-164, ACM, 2004.

(Continued)

*Primary Examiner* — Suresh Memula
(74) *Attorney, Agent, or Firm* — Miles & Stockbridge P.C.

(57) ABSTRACT

A system provides placement of components for an integrated circuit having a plurality of flip-flops. The system clusters the plurality of flip-flops into a plurality of clusters and relocates one or more of the flip-flops in response to overlapping placement locations. The clustering includes using a K-means algorithm to assign a flip-flop to a cluster while adding weight to each cluster based on its current size.

20 Claims, 8 Drawing Sheets

(56) References Cited

OTHER PUBLICATIONS

S. M. Martin et al., "Combined dynamic voltage scaling and adaptive body biasing for lower power microprocessors under dynamic workloads," in Proceedings of the 2002 IEEE/ACM international conference on Computer-aided design, pp. 721-725, ACM, 2002.

Y. Cheon et al., "Poweraware placement," in Proceedings of the 42nd annual Design Automation Conference, pp. 795-800, ACM, 2005.

Y. Lu et al., "Navigating registers in placement for clock network minimization," in Design Automation Conference, 2005. Proceedings. 42nd, pp. 176-181, IEEE, 2005.

D. Jin et al., "Obstacle-Aware Clock-Tree Shaping During Placement", 2011 IEEE Transactions on computer-aided design of integrated circuits and Systems, vol. 31 No. 2, pp. 205-216, Feb. 2012.

W. Hou, "Automatic register banking for lowpower clock trees," 2009.

S. I. Ward et al., "Clock power minimization using structured latch templates and decision tree induction," in Proceedings of the International Conference on Computer-Aided Design, pp. 599-606, IEEE Press, 2013.

I. H.-R. Jiang et al., "Integra: Fast multibit flip-flop clustering for clock power saving," Computer-Aided Design of Integrated Circuits and Systems, IEEE Transactions on, vol. 31, No. 2, pp. 192-204, 2012.

S.-H. Wwang et al., "Power-driven flip-flop merging and relocation," Computer-Aided Design of Integrated Circuits and Systems, IEEE Transactions on, vol. 31, No. 2, pp. 180-191, 2012.

Y.-T. Chang, "Postplacement power optimization with multi-bit flip-flops," in Proceedings of the International Conference on Computer-Aided Design, pp. 218-223, IEEE Press, 2010.

C. Xu et al., "Analytical clustering score with application to post-placement multi-bit flip-flop merging", conference paper, pp. 93-100, Aug. 18, 2015.

S. P. Lloyd, "Least squares quantization in pcm," Information Theory, IEEE Transactions on, vol. 28, No. 2, pp. 129-137, 1982.

A. K. Jain, "Data clustering: 50 years beyond K-means", Pattern Recognition Letters 31, pp. 651-666, 2010.

S. Har-Peled et al., "How fast is the k-means method?", Algorithmica (2005) 41, pp. 185-202, online publication Dec. 8, 2004.

* cited by examiner

| Design | # of Cells | # of Flops | Flop Displ. × 10³ (μm) WB | Flop Displ. × 10³ (μm) Ours | Total Wirelength × 10³ (μm) NC | Total Wirelength × 10³ (μm) WB | Total Wirelength × 10³ (μm) Ours | Clock Switching Power (mW) NC | Clock Switching Power (mW) WB | Clock Switching Power (mW) Ours | Total Switching Power (mW) NC | Total Switching Power (mW) WB | Total Switching Power (mW) Ours |
|---|---|---|---|---|---|---|---|---|---|---|---|---|---|
| D1 | 55K | 9K | 67.58 | 74.44 | 1603.58 | 1678.05 | 1695.22 | 8.04 | 6.23 | 4.50 | 25.28 | 23.29 | 20.81 |
| D2 | 172K | 36K | 237.06 | 190.74 | 4933.80 | 5261.41 | 5193.20 | 24.11 | 18.66 | 17.04 | 71.05 | 69.05 | 66.80 |
| D3 | 229K | 39K | 365.85 | 311.79 | 12444.62 | 12859.46 | 12700.31 | 34.12 | 21.30 | 19.29 | 153.79 | 145.66 | 142.26 |
| D4 | 322K | 58K | 371.03 | 310.82 | 7435.24 | 8480.55 | 7903.40 | 40.99 | 28.08 | 28.07 | 111.47 | 109.39 | 103.83 |
| D5 | 399K | 73K | 1028.83 | 441.55 | 10756.88 | 13027.44 | 11320.31 | 53.18 | 34.11 | 33.43 | 155.44 | 159.47 | 142.17 |
| D6 | 660K | 123K | 954.80 | 859.02 | 20839.08 | 21259.41 | 20091.38 | 102.75 | 67.06 | 59.88 | 293.07 | 271.06 | 260.63 |
| D7 | 537K | 127K | 716.12 | 637.18 | 16090.22 | 17347.86 | 16897.62 | 88.19 | 69.04 | 60.61 | 240.72 | 231.97 | 222.40 |
| D8 | 795K | 166K | 1171.14 | 979.31 | 21223.05 | 22686.25 | 22668.76 | 124.72 | 98.32 | 79.99 | 325.49 | 306.96 | 297.04 |
| Norm. | | | 1.285 | 1.000 | 0.952 | 1.032 | 1.000 | 1.572 | 1.099 | 1.000 | 1.094 | 1.048 | 1.000 |

Fig. 8

FLIP-FLOP CLUSTERING FOR INTEGRATED CIRCUIT DESIGN

FIELD

One embodiment is directed generally to a computer system, and in particular to a computer design tool for integrated circuit design.

BACKGROUND INFORMATION

Very-large-scale integration ("VLSI") circuits and other integrated circuits are made up of interconnected cells that include a group of transistors and interconnect structures. Each cell must be powered from a power supply through a power grid. The power grid of the circuit refers to the wires or buses used to supply current to the logic devices of each cell and to ground buses used to take current away. As electronic circuit densities increase and technology advances, for example, in deep-sub-micron circuits, skilled designers attempt to maximize the utilization of the design layout and the manufacturability and reliability of the circuit, as well as optimizing power consumption.

Specifically, due to the more restrictive temperature constraints and increasing requirements of the battery life, power has become a very important optimization objective for modern VLSI designs. An effective way to reduce power consumption is to put more emphasis on the design and optimization of clock networks, since among the overall chip power consumption, more than 40% of the power can be consumed by the switching power of the clock network.

One reason that clock network consumes so much power is because the clock signals switch much more frequently than regular signals. Another reason is that the clock network often drives a large number of flip-flops which create a large amount of load capacitance. Power optimization for clock networks has been studied for decades and many techniques, such as clock gating, clock buffer sizing, dynamic voltage/frequency scaling, etc., have been developed. However, due to the more and more critical design requirements, simply optimizing the clock routing and optimal buffer sizing is not sufficient enough to satisfy the design requirements.

SUMMARY

A system provides placement of components for an integrated circuit having a plurality of flip-flops. The system clusters the plurality of flip-flops into a plurality of clusters and relocates one or more of the flip-flops in response to overlapping placement locations. The clustering includes using a K-means algorithm to assign a flip-flop to a cluster while adding weight to each cluster based on its current size.

BRIEF DESCRIPTION OF THE DRAWINGS

FIG. 8 illustrates the experimental results in accordance with one embodiment.

DETAILED DESCRIPTION

One embodiment is a design tool that assists in the design of integrated circuits by providing placement of components using a novel flip-flop clustering and relocation framework to help reduce the overall chip power consumption. Embodiments use the clustering algorithm to determine which flip-flops should be grouped together, and then determine placement parameters to move flip-flops toward a center location.

Figure 1:
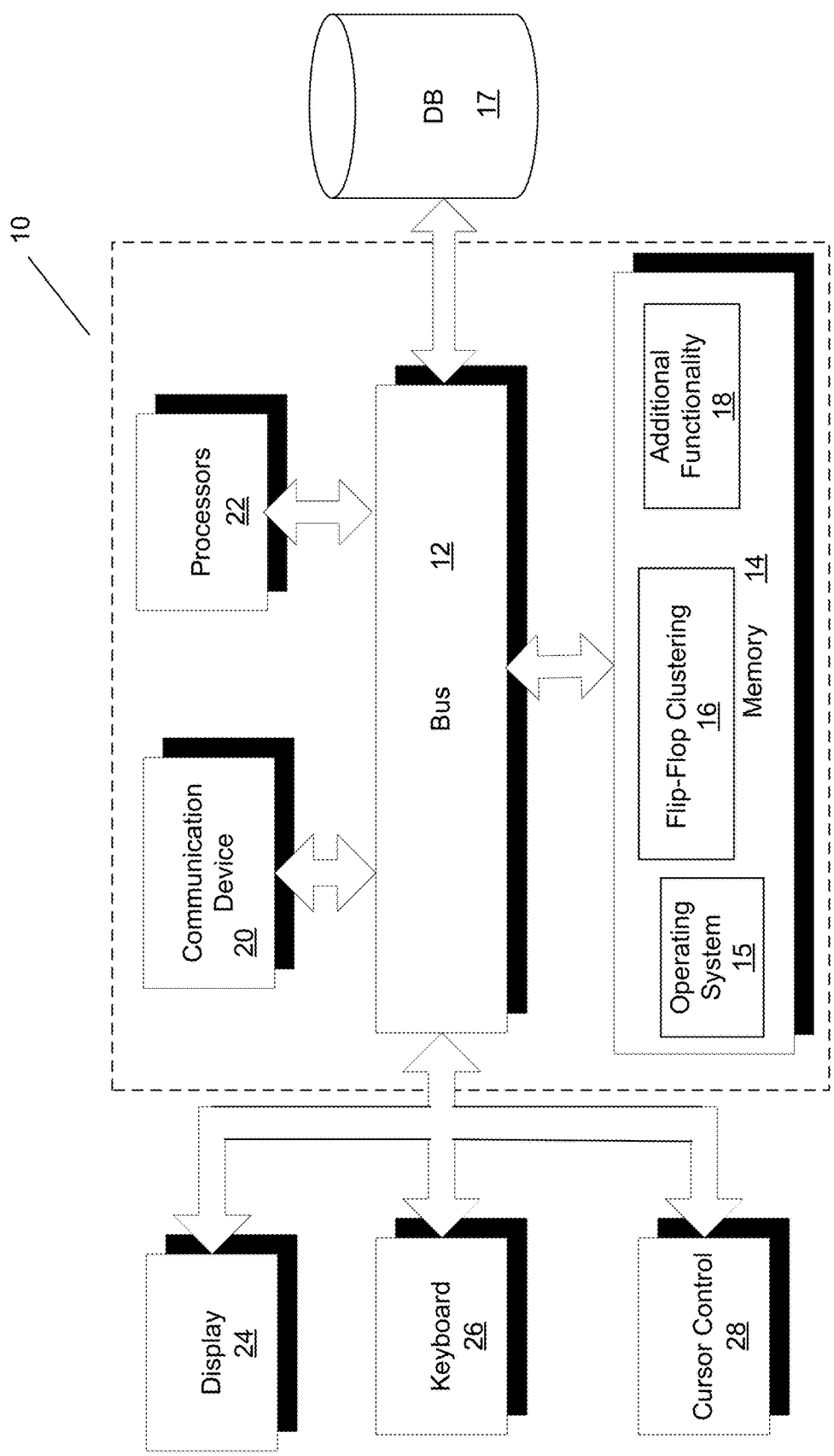
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media or storage device. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include non-transitory media, computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a flip-flop clustering module 16 for clustering flip-flops when designing and providing component placement for integrated circuits ("IC"s), and all other functionality disclosed herein. System 10 can be part of a larger system, such as an electronic design automation ("EDA"). Therefore, system 10 can include one or more additional functional modules 18 to include the additional functionality. A database 17 is coupled to bus 12 to provide centralized storage of data used by modules 16 and 18. Further, in some embodiments where system 10 functions as an EDA tool that is remotely accessed as a server or a web service, various peripheral devices such as keyboard 26 and cursor control 28 may not be needed. Instead, other devices with man-machine interfaces used for IC design may be coupled to system 10 locally or remotely.

One way to minimize power optimization for a clock network when designing ICs is to perform post-placement optimization for flip-flops, often referred to as "flip-flop clustering". Flip-flop clustering is performed after the detailed placement stage, where flip-flops are moved closer together and form them into clusters.

There are many benefits of performing flip-flop clustering after the conventional placement stage. First, since the number of flip-flops per cluster can be controlled to optimize the use of a single clock buffer, the total number of clock buffers used in the design can be much less, and the reduction of the number of clock buffers at the first level can reduce the rest of clock tree. Second, after forming a regular placement structure for all of the flip-flops within one cluster, a simple routing structure, such as fishbone routing, will be able to route the leaf level of the clock tree. Thus, the overall clock wire length can be effectively reduced. In addition, since all of the flip-flops are placed very close to the clock buffer, the clock skew is reduced, which can help improve the timing of the circuit.

The reduction of clock network wire length comes at a cost of the increase of signal wire length and potential timing degradation. However, since modern physical design flows are robust enough to overcome disruptions caused by flip-flop relocation and most of the power is consumed by clock wires, power reduction from flip-flop clustering will be larger than overhead in signal power, resulting in a total power reduction.

Another concern is that flip-flop clustering might hurt the timing of the circuit, as the clustering process might cause some flip-flops to move a very long distance, and the combinational cells can also be moved because of the legalization (i.e., making sure the solution satisfies placement rules). However, the timing degradation can be effectively controlled by minimizing the amount of disturbance in comparison to the original placement and limiting the maximum displacement of flip-flops during the clustering process. In addition, because the timing information at the flip-flop clustering stage is a rough estimate, during the routing stage there are additional opportunities to improve the timing. Therefore, flip-flop clustering is able to produce significant power savings with tolerable delay impact.

Embodiments provide a framework that decomposes the flip-flop clustering problem into two steps: flip-flop clustering and flip-flop relocation. The first step finds the groups of flip-flops to be clustered by a modified K-means algorithm. Further, since the standard K-means algorithm does not enforce any constraints, embodiments in the second step include functionality that can be combined with the K-means algorithm to guarantee the clustering results. Specifically, since the sizes of the clusters generated by the standard K-means algorithm are very unbalanced, embodiments add weights on each cluster at the cluster assignment step of the K-means algorithm at the cluster assignment step of the K-means algorithm to help balance the number of flip-flops within each cluster. Further, in the flip-flop relocation step, embodiments move the flip-flops into legal locations based on placement rules with respect to the placement blockages and form them into regularly structured clusters.

The standard K-means algorithm finds a partition such that the sum of Euclidean distance between the cluster center and the instances is minimized. For flip-flop clustering, the cluster center is calculated as the mean location of all the instances within the cluster. Specifically, let N be the total number of instances to be clustered. The x-coordinates of instances are denoted by a vector $x=(x_1; x_2; ---; x_N)$ and y-coordinates are denoted by a vector $y=(y_1; y_2; ---; y_N)$. Let $C=(C_1; C_2; ---; C_K)$ be a set of K clusters of instances. Let $u_x(C_k)$ and $u_y(C_k)$ be the x and y coordinate of the center of cluster $C_k$. The problem solved by the K-means algorithm can be formally expressed as:

$$\text{Min} \sum_{k=1}^{K} \sum_{(x_i, y_i) \in C_k} (\|x_i - \mu_x(C_k)\|^2 + \|y_i - \mu_y(C_k)\|^2) |$$

The steps of the standard K-means algorithm which solves the above problem are as follows:

Step 1: Choose K initial cluster center locations.

Step 2: Assign each instance to the cluster which provides the smallest cost.

Step 3: Recompute the center location of each cluster.

Step 4: Repeat steps 2 and 3 until there is no further change in costs of all instances, or the algorithm reaches max iteration limit.

Here, the cost of assigning an instance locating at $(x_i, y_i)$ to cluster $C_k$ is defined as:

$$\text{Cost}=\|x_i-\mu_x(C_k)\|^2+\|y_i-\mu_y(C_k)\|^2$$

The runtime of the standard K-means algorithm is $O(t*N*K)$, where t is the number of iterations until convergence. In practice, t is often small and the results only improve slightly after few iterations, which makes the K-means algorithm to be very fast compared with other clustering methods, especially for very large scale data sets.

Embodiments apply the K-means algorithm so that the instances to be clustered are flip-flops. The flip-flop displacement caused by the clustering process can be approximated as the Manhattan distance between the flip-flop and the cluster center. Then, the flip-flop clustering problem which minimizes the total sum of flip-flop displacement and K, while satisfies the cluster size constraints and flop displacement constraints can be formulated as follows:

$$\text{Min} \sum_{k=1}^{K} \sum_{(x_i, y_i) \in C_k} (|x_i - \mu_x(C_k)| + |y_i - \mu_y(C_k)|) + \alpha * K$$

Subject to $|C_k| \leq \text{size\_limit} \quad \forall k$ $|x_i - \mu_x(C_k)| + |y_i - \mu_y(C_k)| \leq \text{disp\_limit}$ $\forall k$ and $\forall (x_i, y_i) \in C_k$ where α is a constant value adjusting the effort between minimizing displacement and K. size_limit is a given constant value that denotes the cluster size limit. disp_limit; is the maximum allowable displacement for flip-flop i according to its timing criticality.

Figure 2:
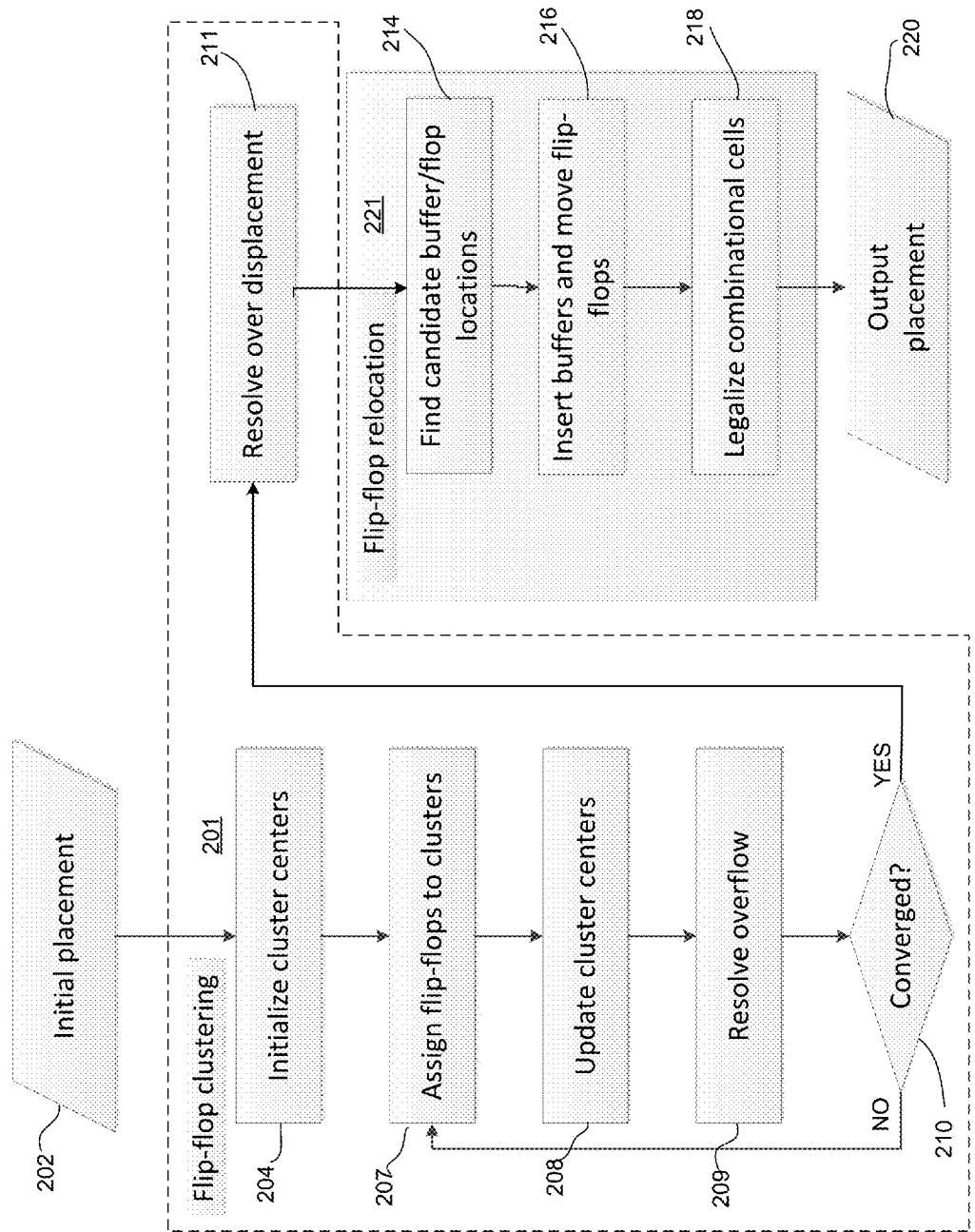
FIG. 2 is a flow diagram of the functionality of the system of FIG. 1 when clustering flip-flops in accordance with an embodiment.

FIG. 2 is a flow diagram of the functionality of system 10 of FIG. 1 when clustering flip-flops in accordance with an embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In general, the functionality of FIG. 2 is a two-step flip-flop clustering framework, flip-flop clustering and flip-flop relocation. Embodiments at 202 begin with a timing optimized, legalized placement (i.e., a solution that satisfies placement rules). At the flip-flop clustering portion 201, at 204, K cluster center locations are initialized. Then, at 207-211, a clustering solution satisfying the cluster size constraints and flip-flop displacement constraints is generated by the weighted K-means algorithm, described in detail below.

At the flip-flop relocation portion 221, first at 214, legal locations for clock buffers and flip-flops are found. Then, at 216, buffers are inserted per cluster and flip-flops are relocated. At 218, the combinational cells are legalized with flip-flop locations fixed. At 220, the optimized placement is output.

Referring again to 204 of FIG. 2, the functionality of initializing cluster centers involves finding a proper K value, which can be difficult, since increasing K will result in a smaller total flip-flop displacement, but also increase the number of clock buffers used in the design. A trivial solution would be driving each flip-flop by one clock buffer. Instead, in embodiments, a large "alpha" in the objective function is used to minimize K, due to the minimizing objective function. After K is decided, K initial cluster center locations also need to be found, which can affect the clustering results and the number of iterations required to converge. One commonly used idea is to randomly pick K instance locations from the data set and use them as the initial center locations. However, this will introduce randomness into the framework, which might cause troubles for the physical design convergence. Instead, embodiments use the following recursive bipartition approach ("Algorithm 1") to help find an initial K value and deploy K center locations on the placement region:

---
Algorithm 1 Initialize K Cluster Centers
---
1:     function INITCENTER(S, K);
2:     if |S| ≤ size_limit then
3:     Initiate a center at $\left(\sum_{x_i \in S} x_i / |S|, \sum_{y_i \in S} y_i / |S|\right)$;
4:     return
5:     end if
6:     Bipartite S into $S_1$, $S_2$
7:     with $|S_1| = |S| * \lfloor K/2 \rfloor/|K|$, $|S_2| = |S| * \lceil K/2 \rceil/|K|$;
8:     INITCENTER($S_1$, $\lfloor K/2 \rfloor$);
9:     INITCENTER($S_2$, $\lceil K/2 \rceil$);
10:     end function
---

In Algorithm 1, S denotes the set of flip-flops to be partitioned. Since α is large, it is the best to generate a solution with K as small as possible. Initially, K=|S|=size_limit is roughly set. The function returns when the number of flip-flops to be partitioned is no more than size_limit. Otherwise, the flip-flops are split into two partitions with one partition having $|S|*\lfloor K/2 \rfloor/|K|$ flip-flops and the other has $|S|*\lceil K/2 \rceil/|K|$ flip-flops. Therefore, in one embodiment both partitions have an equal number of flip-flops, or the second partition has one more flip-flop than the first partition. This makes the number of flip-flops assigned at each partition be proportional to the number of clusters at each partition. In particular, the flip-flops are sorted based on their x or y coordinates depending on whether vertical or horizontal partition is performed at this iteration. Then, flip-flops are assigned to $S_1$ based on their sorted order the desired number of flip-flops are reached for this partition. The rest of the flip-flops will be assigned to $S_2$.

Referring to 207 of FIG. 2, in assigning flip-flops to clusters, the standard K-means algorithm assigns a flip-flop to the cluster whose center yields the smallest Euclidean distance. Considering wires can only be horizontal or vertical during the routing, embodiments use Manhattan distance instead of Euclidean distance. Thus, the cluster can be picked based on the following cost function ("Equation 1"):

$$\text{Cost} = |x_i - \mu_x(C_k)| + |y_i - \mu_y(C_k)|$$

Figure 3A:
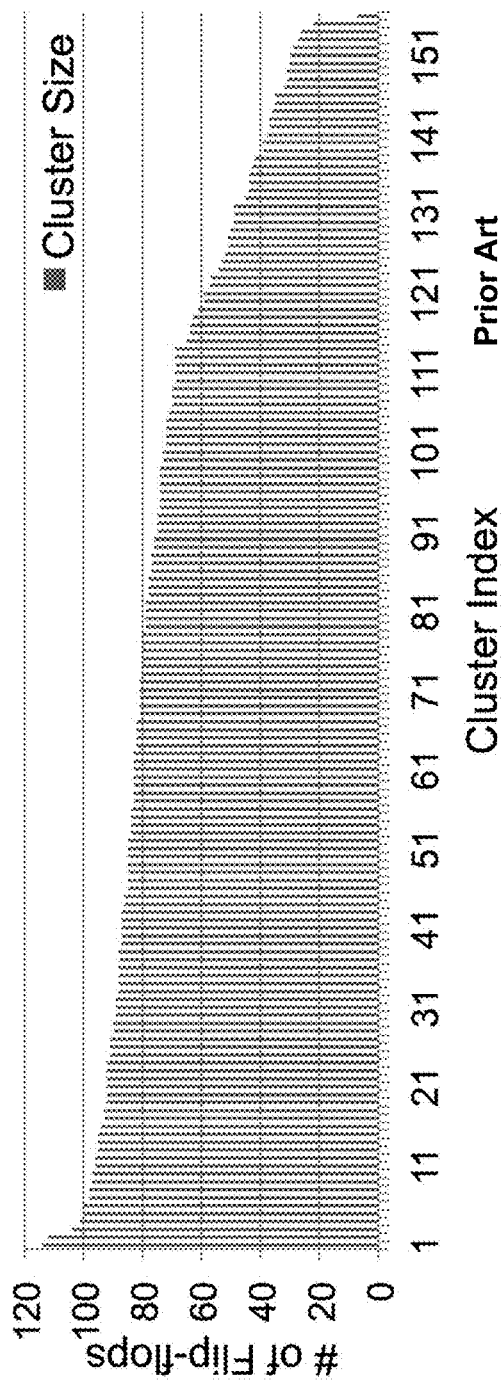
FIG. 3A graphically illustrates an example of an unbalanced cluster.

However, if the clustering results are generated using the above cost function, the sizes of the clusters can be very unbalanced, which makes it difficult to satisfy the cluster size constraints required by embodiments. FIG. 3A graphically illustrates an example of an unbalanced cluster in accordance with the prior art. In FIG. 3A, the X axis lists the index of each cluster and is sorted based on the cluster size. The Y axis shows the number of flip-flops within each cluster. Considering the maximum allowable cluster size to be 80, it can be seen that there are many clusters which are over the size limit (e.g., approximately 20-40%). This is because with the prior art, in general there is no direct control to limit cluster size, so in a high density area, many flip-flops would be assigned to a nearby cluster center and cause an oversized partition.

In contrast, in order to have a more balanced clustering results, embodiments add a weight to each cluster based on its current size. In general, embodiments to set a higher weight to a cluster if it contains more flip-flops. Thus, flip-flops will have a lower tendency to be assigned to this cluster, since the cost of choosing the cluster is set to be the original cost multiplied by the current weight of this cluster. However, when choosing a proper weight setting method, there is a need to consider the trade-off between cell displacement and the balancing of cluster sizes. In particular, a higher weight or history based weight provides less overflow but larger total flip-flop displacement. Embodiments use a smaller and non-history based weight, which provides a better total displacement. The overflowed clusters can be effectively handled at resolve overflow 209 of FIG. 2 as follows ("Equation 2"):

$$|\text{Cost} = (|x_i - \mu_x(C_k)| + |y_i - \mu_y(C_k)|) * \max((|C_k|/\text{size\_limit}), 1)$$

Where the "max" is the current weight multiplier. In general, in accordance with Equation 2, only the partitions that go over the size limit are penalized, and the cost of assignment to an oversized partition is adjusted by a factor larger than 1, thus discouraging the assignment.

Figure 3B:
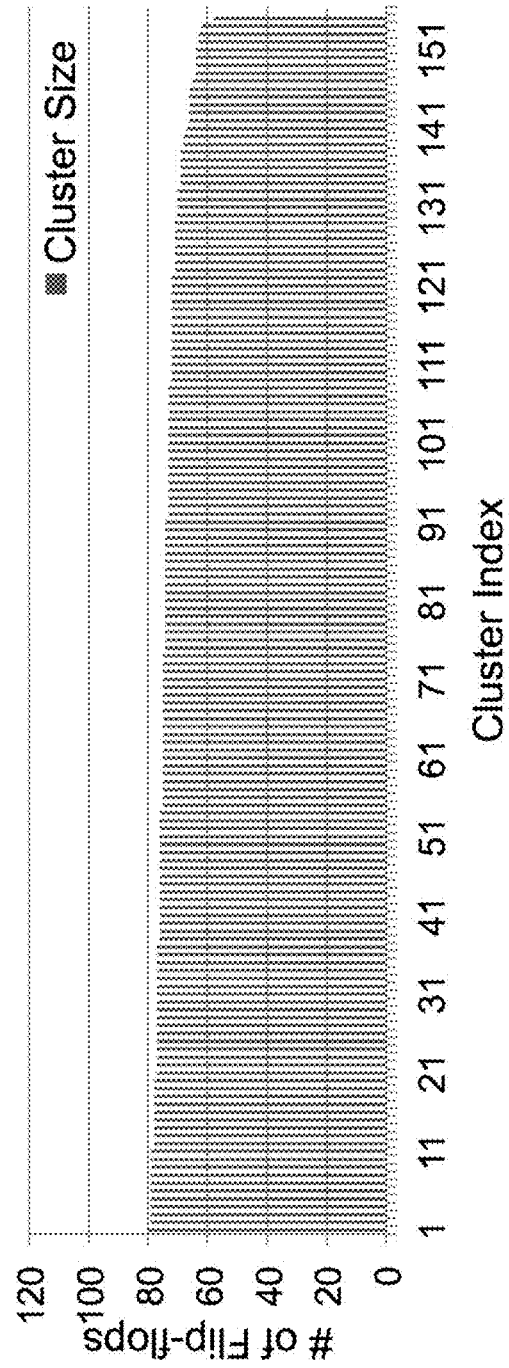
FIG. 3B graphically illustrates an example of a balanced cluster in accordance with embodiments of the invention.

FIG. 3B graphically illustrates an example of a balanced cluster in accordance with embodiments of the invention. As shown in FIG. 3B, all of the cluster sizes are around the size_limit. As shown, embodiments provide an improved tradeoff between displacement and cluster size, and provide the benefits of a more balanced cluster.

Figure 4B:
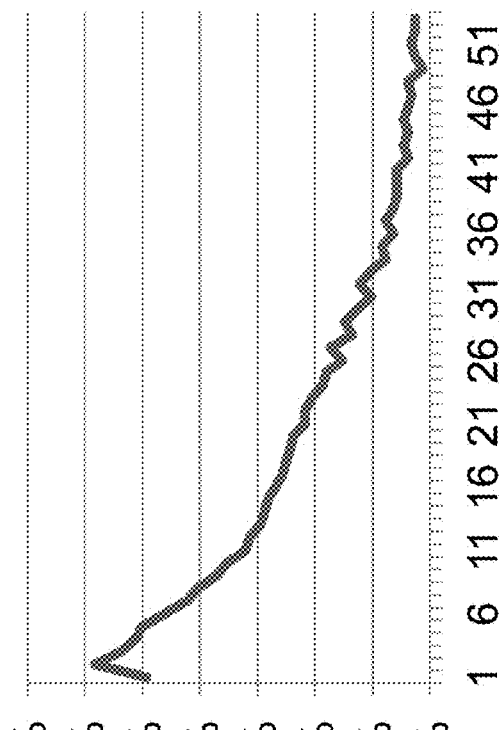
FIGS. 4A and 4B graphically illustrate the effectiveness of the weighted K-means algorithm in accordance with embodiments of the invention.
Figure 4A:
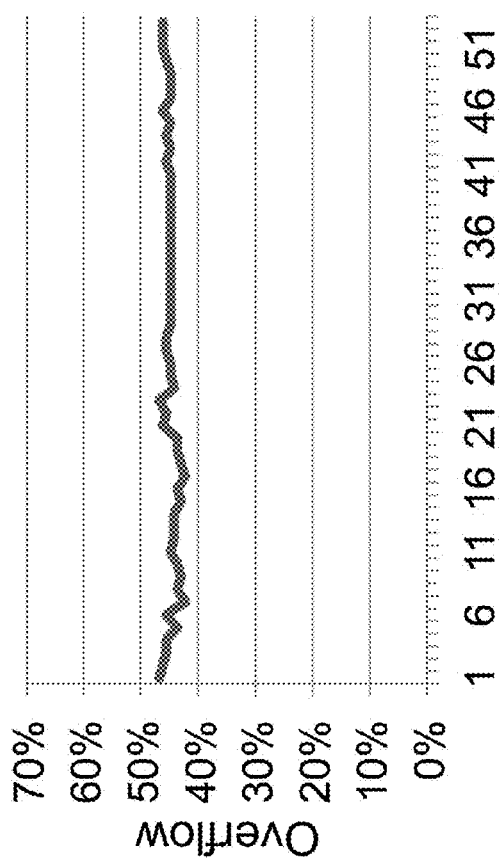

FIGS. 4A and 4B graphically illustrate the effectiveness of the weighted K-means algorithm in accordance with embodiments of the invention. In FIGS. 4A and 4B, the X axis shows the number K-means iteration and the Y axis shows the percentage of overflowed clusters. In FIG. 4A, the standard K-means algorithm is used, and in FIG. 4B the weighted K-means algorithm in accordance to the embodiments of the invention is used. After the weighted cost function is used, as shown in FIG. 4B, the percentage of overflowed clusters becomes less and less when more iterations of the K-means algorithm are performed.

In the first iteration of the K-means algorithm, in one embodiment Equation 1 above is used to calculate the cost at the flip-flop assignment (207 of FIG. 2) since all clusters are empty in the beginning. In the rest of the K-means iterations, the cluster assignment of each flip-flop at 207 is updated based on the cost determined by Equation (2). In one embodiment, the weight of the cluster should be updated immediately, which means whenever a flip-flop is moved from one cluster to the other, the weight of the corresponding two clusters needs to be updated. Otherwise, oscillation problems can happen: in one iteration, many flip-flops are moved into one cluster, but in next iteration, all these flip-flops move away due to the huge weight of this cluster caused at the previous iteration. This can make the K-means algorithm become very difficult to converge.

Referring to 208 of FIG. 2, the centers of each cluster are recalculated as the mean value of the flip-flop locations as follows:

$$\mu_x(C_k) = \sum_{x_i \in C_k} x_i / |C_k|, \quad \mu_y(C_k) = \sum_{y_i \in C_k} y_i / |C_k| \quad \forall k.$$

Referring to 209 of FIG. 2, for some designs such as the one shown in FIG. 3B, simply adding weights in the cost function will make all clusters satisfy the size constraints. However, this cannot be guaranteed for all the designs. Therefore, at 209 of FIG. 2, the overflow resolving functionality is added within the K-means iteration which guarantees that all cluster sizes are under the size limit when the weighted K-means algorithm terminates.

In one embodiment, to resolve overflow, at every certain K-means iterations, one cluster is chosen which has most number of flip-flops among all the clusters violating the size constraints. Then, a new center is inserted near the center of this cluster and a new empty cluster is created accordingly. Next, if a smaller cost can be achieved, the flip-flop in the overflowed cluster will be moved to this new cluster. The weights of these two clusters are also updated accordingly.

The K-means iteration continues until all the clusters satisfy the size constraints and there is no improvement on costs of all the flip-flops within certain iterations at 210.

Referring to 211 of FIG. 2, if the number of clusters (K) is sufficient and the disp_limit$_i$ is not too small, most of the flip-flops will satisfy the displacement constraint for the clustering solution generated by the weighted K-means algorithm. However, there are some corner cases for which one flip-flop can be extremely far away from other flip-flops in the original legalized placement. Thus, it may be necessary to develop a post-processing step to fix the over displacement problems for these particular flip-flops.

Embodiments resolve over displacement at 211 by inserting a new cluster centered at the location of the violating flip-flop. Then, the violating flip-flop is assigned to this new cluster. To take the most advantage of this new cluster, nearby flip-flops are also assigned to this new cluster if smaller costs can be achieved. Different from resolving overflow, the over displacement within the K-means iteration cannot be resolved, since the resolve displacement step inserts a small weight cluster which can be pulled away from the violating flip-flop by other flip-flops during the K-means iteration.

Referring to 214 of FIG. 2, as part of the flip-flop relocation, embodiments find candidate buffer and flip-flop locations. The desired clock buffer location is the mean center location generated by the weighted K-means algorithm. However, it is possible that this location is overlapping with some placement blockages. In this case, embodiments search around and find the nearest legal location as the candidate buffer location.

Figure 5B:
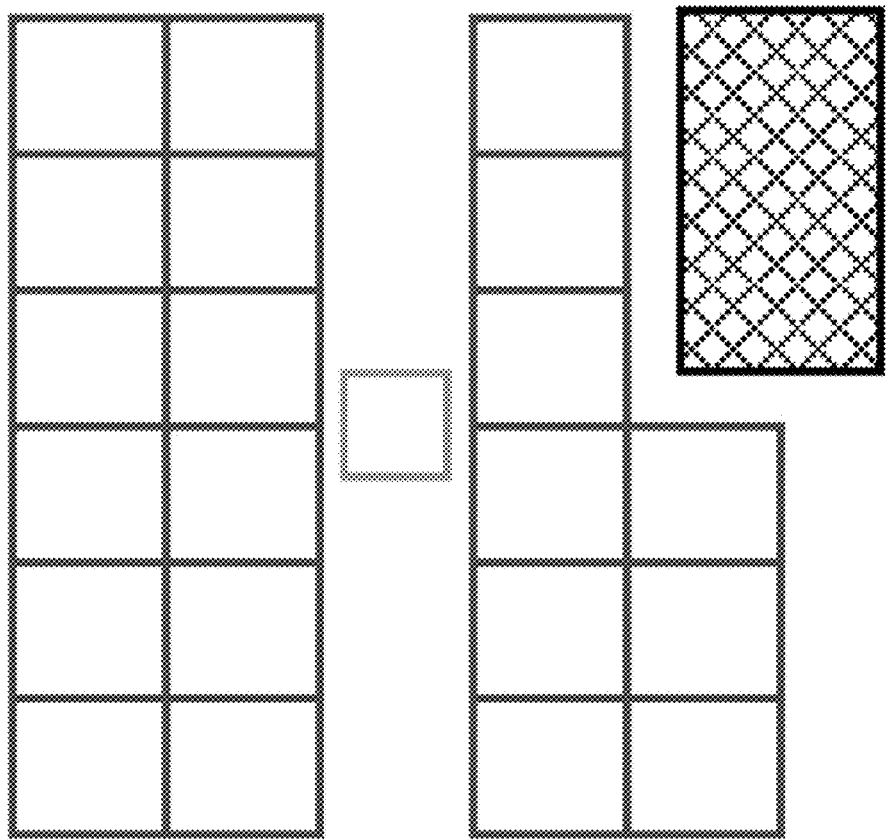
FIG. 5B illustrates an enlarged 4×6 configuration to achieve sufficient candidate flip-flop locations in accordance with one embodiment.
Figure 5A:
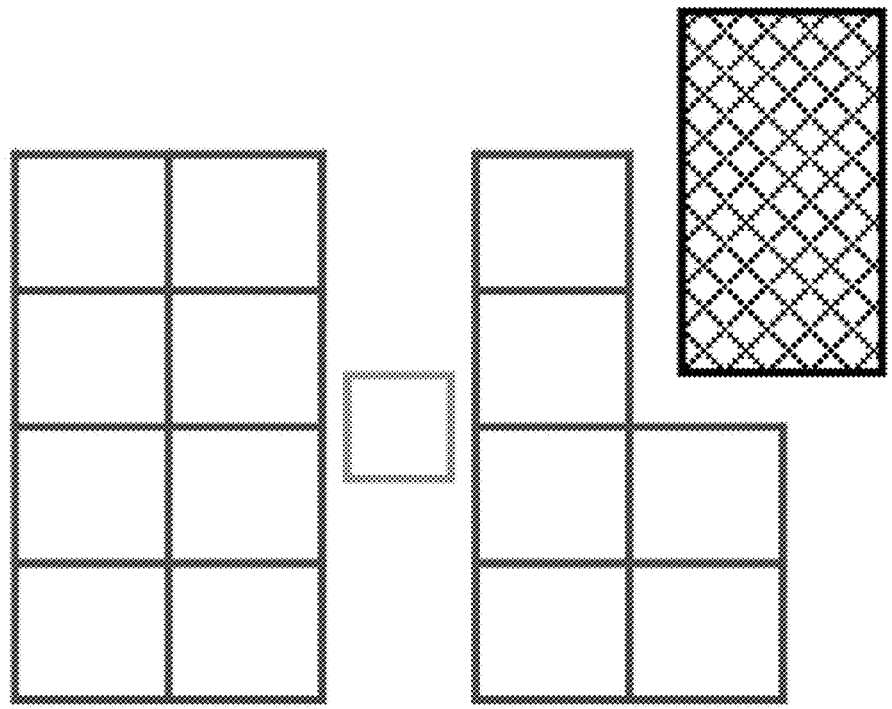
FIG. 5A illustrates a 4×4 configuration for the wing structure with blockage overlapping locations removed in accordance with one embodiment.

Embodiments form the flip-flops within one cluster into a wing structure which has an empty column over the clock buffer. To find candidate flip-flop locations, a default configured wing structure is formed first, according to the location of the clock buffer. Then, candidate locations which are overlapping with the blockages will be removed. FIG. 5A illustrates a 4×4 configuration for the wing structure with blockage overlapping locations removed in accordance with one embodiment. If the remaining candidate locations are not enough to allocate all the flip-flops within this cluster, a new configuration is used to enlarge the wing structure until sufficient candidate flip-flop locations are found. FIG. 5B illustrates an enlarged 4×6 configuration to achieve sufficient candidate flip-flop locations in accordance with one embodiment.

Figure 6:
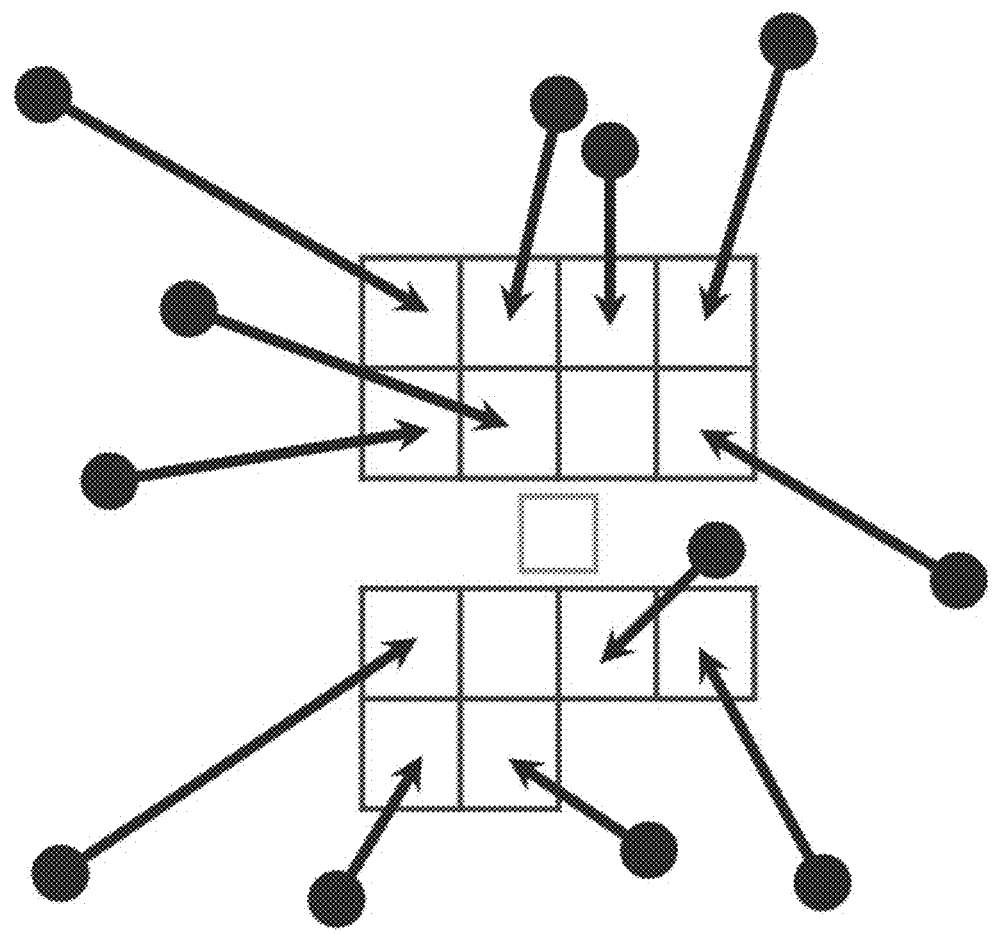
FIG. 6 illustrates moving flip-flops into candidate locations in accordance with one embodiment.

Referring to 216 of FIG. 2, as part of the flip-flop relocation, embodiments insert buffers and relocate flip-flops. First, buffers are inserted at the candidate buffer location. Then, flip-flops are sequentially moved to the candidate flop locations. FIG. 6 illustrates moving flip-flops into candidate locations in accordance with one embodiment. In particular, for each flip-flop, all candidate locations within the wing structure are tried and the one which provides the smallest displacement is picked. After the flip-flop is relocated to the candidate location, this location will no longer be available for other flip-flops. The order used to relocate the flip-flops is based on their timing criticality and the flip-flop which is more timing critical will be moved first.

Figure 7B:
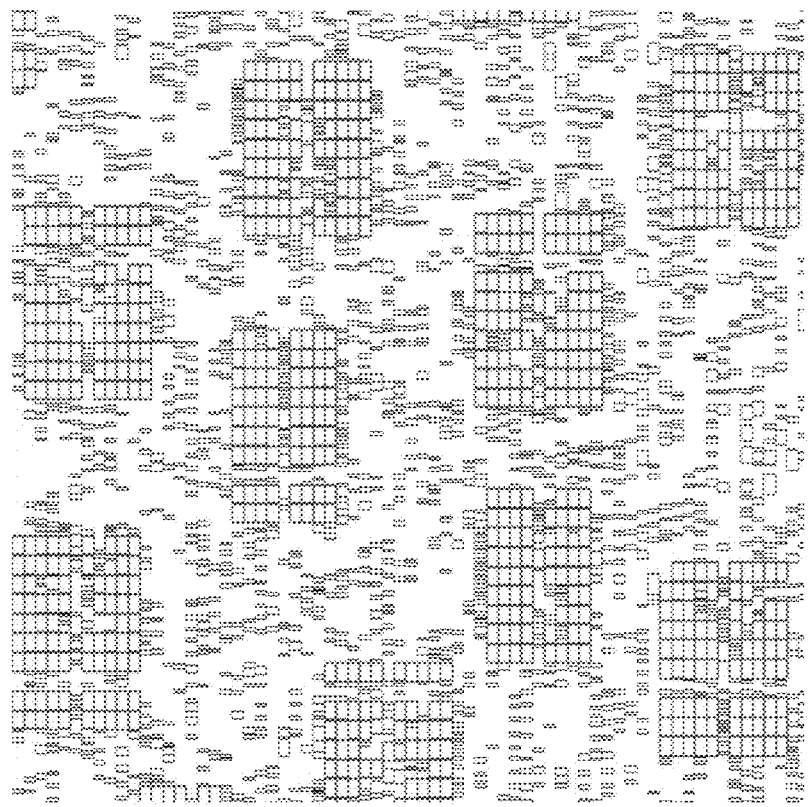
FIG. 7B illustrates cluster results after clustering and clock routing relocation in accordance to embodiments of the invention.
Figure 7A:
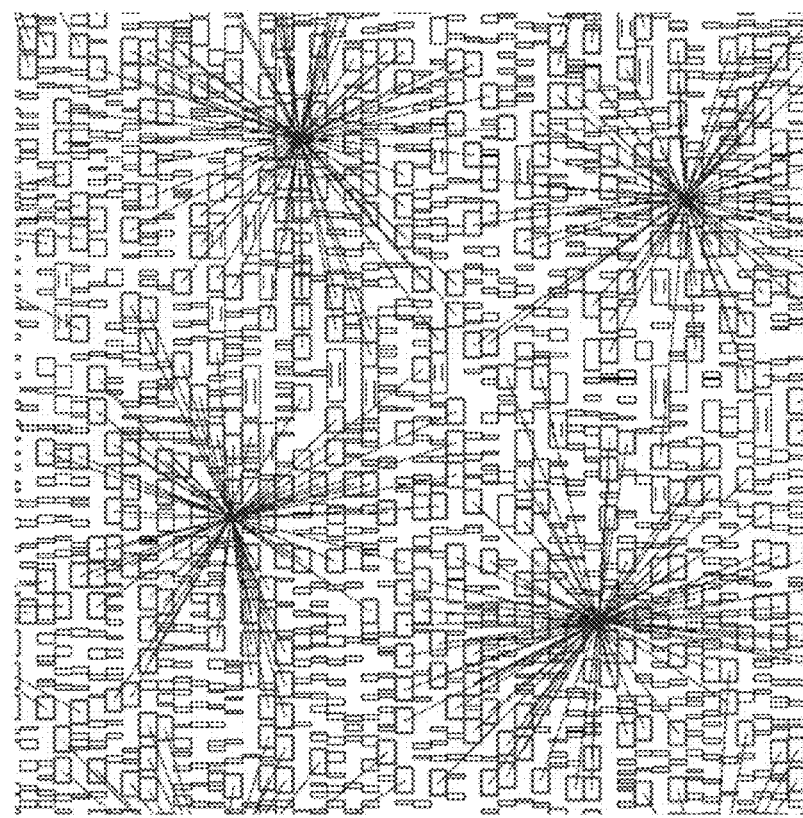
FIG. 7A illustrates cluster results after performing flip-flop clustering in accordance to embodiments of the invention.

In the end, the orientation of the flip-flops in one embodiment is also adjusted to make sure their clock pins are properly aligned to help reduce the clock wire length. FIG. 7A illustrates cluster results after performing flip-flop clustering in accordance to embodiments of the invention. In FIG. 7A, each flip-flop is assigned to one cluster which is denoted by fly lines connecting the flip-flops to the center of the cluster. FIG. 7B illustrates cluster results after clustering and clock routing relocation in accordance to embodiments of the invention.

Embodiments of the invention have been evaluated on eight actual industrial designs ranging from 55K to 795K cells. These designs are placed using a state-of-art commercial physical design tool as an input to both a known "window based" flip-flop clustering flow and the framework in accordance to embodiments of the invention. In particular, the known window based flip-flop clustering flow looks for flip-flops to group window by window. All the flip-flops within a window are greedily moved together to form a cluster.

In the evaluation, the size_limit is set to be 80 and the disp_limit; to be 60 μm for all of the flip-flops, which is same as the value used in the window based industrial flow. The flip-flop clustering is performed at each group of flip-flops having the same clock domain and sharing a common enable signal. In addition, the resolve overflow step is performed at every 5 K-means iteration and the loop terminates when there is no improvement within 10 iterations. After the flip-flop relocation, a commercial physical design tool is used to legalize the combinational cells if they are overlapping with the relocated flops. In the end, the rest of clock tree is constructed using a commercial clock tree synthesis ("CTS") tool and the design is routed to get the wire load.

Since the static power consumption will not be affected by the flip-flop locations, the switching power is compared among all the flows. The switching power for both clock and signal nets are estimated using the traditional $\beta * C_{load} * Vdd^2 * f_{clock}$ which is a good approximation for interconnect power. Here, β denotes the switching activity factor.

FIG. 8 illustrates the experimental results in accordance with one embodiment. "NC" denotes the prior art non-clustering flow. "WB" denotes the prior art window based flip-flop flow. "Ours" denotes clustering based on embodiments of the invention. The "Flop Disp." column shows the total flip-flop displacement. The "Total Wirelength" column shows the total wire length which includes clock nets and regular signal nets. Compared with the flip-flop displacement, embodiments of the invention are 28.3% better than the prior art window based flow. This indicates that embodiments of the invention have much less disturbance on the original placement results and is much easier to achieve timing closure compared with the window based flow. For the clock switching power, embodiments of the invention are 57.2% better than the flow without any flip-flop clustering and 9.9% better than the window based flow. For the total switching power, embodiments of the invention are 9.4% better than the non-clustering flow and 4.8% better than the window based flow. These shows that embodiments of the invention are very effective on reducing dynamic power consumption. The average number of flip-flops per cluster is around 73 for all clustering results using embodiments of the invention, which indicates the clock buffer being used is close to minimum.

As disclosed, one embodiment is a flip-flop clustering framework to help reduce power consumption at post-placement stage. The weights in the cost function of the K-means algorithm allows embodiments to generate a more balanced clustering results, which makes the K-means algorithm suitable for the flip-flop clustering problem. Further, embodiments guarantee the clustering results satisfy the size and displacement constraints.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide component placement for an integrated circuit having a plurality of flip-flops, the placement comprising:

clustering the plurality of flip-flops into a plurality of clusters; and relocating one or more of the flip-flops in response to overlapping placement locations;

wherein the clustering comprises using a K-means algorithm to assign a flip-flop to a cluster while adding weight to each cluster based on its current size, a first cluster will have a higher weight than a second cluster when the first cluster includes more flip-flops than the second cluster, and a cost function is used to assign the flip-flop to the cluster, the cost function comprises a weight multiplier using the added weight.

2. The computer readable medium of claim 1, wherein the placement further comprises:

initializing K cluster centers by sorting the flip-flops into partitions so that a number of flip-flops assigned to each partition is proportional to a number of clusters at each partition.

3. The computer readable medium of claim 1, wherein the assign the flip-flop to the cluster is based on the cost function comprising:

$$|Cost=(|x_i-\mu_x(C_k)|+|y_i-\mu_y(C_k)|)*\max((|C_k|/\text{size\_limit}), 1).$$

4. The computer readable medium of claim 1, wherein the clustering the plurality of flip-flops into the plurality of clusters comprises determining centers of each cluster as a mean value of flip-flop locations comprising:

$$\mu_x(C_k) = \sum_{x_i \in C_k} x_i/|C_k|, \quad \mu_y(C_k) = \sum_{y_i \in C_k} y_i/|C_k| \ \forall\, k.$$

5. The computer readable medium of claim 1, the placement further comprising resolving overflow so that all cluster sizes are under a size limit, the resolving overflow comprising:

choosing a third cluster which has a most number of flip-flops among all clusters violating a size constraint; and inserting a new cluster in a center of the chosen cluster and creating a new empty corresponding cluster.

6. The computer readable medium of claim 1, wherein the using the K-means algorithm to assign the flip-flop to the cluster while adding weight to each cluster based on its current size is repeated until all clusters satisfy a size constraint.

7. The computer readable medium of claim 1, the placement further comprising:

finding locations for all clock buffers and flip-flops that meet placement rules;

inserting buffers per cluster and relocating flip-flops;

configuring combinational cells to meet placement rules and fixing flip-flop locations; and outputting an optimized flip-flop placement.

8. A method of providing component placement for an integrated circuit having a plurality of flip-flops, the method comprising:

clustering the plurality of flip-flops into a plurality of clusters; and relocating one or more of the flip-flops in response to overlapping placement locations;

wherein the clustering comprises using a K-means algorithm to assign a flip-flop to a cluster while adding weight to each cluster based on its current size, a first cluster will have a higher weight than a second cluster when the first cluster includes more flip-flops than the second cluster, and a cost function is used to assign the flip-flop to the cluster, the cost function comprises a weight multiplier using the added weight.

9. The method of claim 8, wherein the clustering further comprises:
initializing K cluster centers by sorting the flip-flops into partitions so that a number of flip-flops assigned to each partition is proportional to a number of clusters at each partition.

10. The method of claim 8, wherein the assign the flip-flop to the cluster is based on the cost function comprising:
$$|Cost=(|x_i-\mu_x(C_k)|+|y_i-\mu_y(C_k)|)*\max((|C_k|/\text{size\_limit}), 1).$$

11. The method of claim 8, wherein the clustering the plurality of flip-flops into the plurality of clusters comprises determining centers of each cluster as a mean value of flip-flop locations comprising:
$$\mu_x(C_k) = \sum_{x_i \in C_k} x_i/|C_k|, \quad \mu_y(C_k) = \sum_{y_i \in C_k} y_i/|C_k| \quad \forall\, k.$$

12. The method of claim 8, further comprising resolving overflow so that all cluster sizes are under a size limit, the resolving overflow comprising:
choosing a third cluster which has a most number of flip-flops among all clusters violating a size constraint; and
inserting a new cluster in a center of the chosen cluster and creating a new empty corresponding cluster.

13. The method of claim 8, wherein the using the K-means algorithm to assign the flip-flop to the cluster while adding weight to each cluster based on its current size is repeated until all clusters satisfy a size constraint.

14. The method of claim 8, further comprising:
finding locations for all clock buffers and flip-flops that meet placement rules;
inserting buffers per cluster and relocating flip-flops;
configuring combinational cells to meet placement rules and fixing flip-flop locations; and
outputting an optimized flip-flop placement.

15. An integration circuit design system comprising:
a clustering module that clusters a plurality of flip-flops into a plurality of clusters using a K-means algorithm to assign a flip-flop to a cluster while adding weight to each cluster based on its current size; and
a relocation module that relocates one or more of the flip-flops in response to overlapping placement locations;
wherein a first cluster will have a higher weight than a second cluster when the first cluster includes more flip-flops than the second cluster, and a cost function is used to assign the flip-flop to the cluster, the cost function comprises a weight multiplier using the added weight.

16. The integration circuit design system of claim 15, wherein the clustering module further initializes K cluster centers by sorting the flip-flops into partitions so that a number of flip-flops assigned to each partition is proportional to a number of clusters at each partition.

17. The integration circuit design system of claim 15, wherein the assign the flip-flop to the cluster is based on the cost function comprising:
$$|Cost=(|x_i-\mu_x(C_k)|+|y_i-\mu_y(C_k)|)*\max((|C_k|/\text{size\_limit}), 1).$$

18. The integration circuit design system of claim 15, wherein the clustering the plurality of flip-flops into the plurality of clusters comprises determining centers of each cluster as a mean value of flip-flop locations comprising:
$$\mu_x(C_k) = \sum_{x_i \in C_k} x_i/|C_k|, \quad \mu_y(C_k) = \sum_{y_i \in C_k} y_i/|C_k| \quad \forall\, k.$$

19. The integration circuit design system of claim 15, the clustering module further comprising resolving overflow so that all cluster sizes are under a size limit, the resolving overflow comprising:
choosing a third cluster which has a most number of flip-flops among all clusters violating a size constraint; and
inserting a new cluster in a center of the chosen cluster and creating a new empty corresponding cluster.

20. The integration circuit design system of claim 15, wherein the using the K-means algorithm to assign the flip-flop to the cluster while adding weight to each cluster based on its current size is repeated until all clusters satisfy a size constraint.

* * * * *